US012624522B2

(12) United States Patent
Terashima

(10) Patent No.: US 12,624,522 B2
(45) Date of Patent: May 12, 2026

(54) WORK MACHINE

(71) Applicant: Yanmar Holdings Co., Ltd., Osaka (JP)

(72) Inventor: Jun Terashima, Fukuoka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 401 days.

(21) Appl. No.: 18/106,457

(22) Filed: Feb. 6, 2023

(65) Prior Publication Data

US 2023/0272594 A1     Aug. 31, 2023

(30) Foreign Application Priority Data

Feb. 28, 2022     (JP) ................................. 2022-028822

(51) Int. Cl.
| | |
|---|---|
| *E02F 9/08* | (2006.01) |
| *B60K 1/04* | (2019.01) |
| *B60K 11/06* | (2006.01) |
| *B60K 11/08* | (2006.01) |
| *B60L 50/60* | (2019.01) |
| *E02F 9/22* | (2006.01) |

(52) U.S. Cl.
CPC .............. *E02F 9/0866* (2013.01); *B60K 1/04* (2013.01); *B60K 11/06* (2013.01); *B60K 11/08* (2013.01); *B60L 50/66* (2019.02); *E02F 9/0883* (2013.01); *E02F 9/226* (2013.01); *B60K 2001/0422* (2013.01); *B60L 2200/40* (2013.01)

(58) Field of Classification Search
CPC ....... E02F 9/0866; E02F 9/207; E02F 9/2095; E02F 9/0858; E02F 9/0883; E02F 9/226; E02F 9/08; E02F 9/0833; E02F 9/0891; E02F 9/20; E02F 9/2058; E02F 9/2091; E02F 3/325; E02F 3/00; B60K 1/04; B60K 1/00; B60K 2001/0422; B60K 2001/005; B60K 2001/0438; B60K 2001/003; B60K 11/06; B60K 11/08; B60K 11/00; B60K 25/00; B60L 50/66; B60L 50/64; B60L 50/00; B60L 50/50; B60L 50/60; B60L 2200/40; B60Y 2200/41; B60Y 2200/412; B60Y 2306/05
See application file for complete search history.

(56) References Cited

U.S. PATENT DOCUMENTS

| | | | | |
|---|---|---|---|---|
| 6,678,972 B2 * | 1/2004 | Naruse | ...................... | E02F 9/16 903/903 |
| 6,922,925 B2 * | 8/2005 | Watanabe | ................. | E02F 9/00 123/41.62 |
| 7,021,074 B2 * | 4/2006 | Hara | .................. | B60H 1/00378 62/244 |

(Continued)

FOREIGN PATENT DOCUMENTS

| | | |
|---|---|---|
| JP | 03713480 B2 | 11/2005 |
| JP | 2006069357 A | 3/2006 |

(Continued)

*Primary Examiner* — James M Dolak
(74) *Attorney, Agent, or Firm* — Chris Mizumoto

(57) ABSTRACT

A work machine includes a battery pack, a first vent provided at a rear end of a machine body, a fan located between the first vent and the battery pack, a second vent located in front of and above the battery pack, and an electric motor rotated by electric power from the battery pack.

11 Claims, 11 Drawing Sheets

(56) References Cited

U.S. PATENT DOCUMENTS

| 7,134,519 | B2 * | 11/2006 | Imashige | E02F 9/0891 |
| | | | | 180/69.24 |
| 7,374,208 | B2 * | 5/2008 | Yamamoto | B60K 15/063 |
| | | | | 180/327 |
| 7,388,301 | B2 * | 6/2008 | Komiyama | E02F 9/2075 |
| | | | | 290/40 C |
| 7,900,996 | B2 * | 3/2011 | Kimura | E02F 9/163 |
| | | | | 296/190.09 |
| 8,037,963 | B2 * | 10/2011 | Nishimura | E02F 9/2292 |
| | | | | 180/291 |
| 8,100,210 | B2 * | 1/2012 | Takeuchi | H01M 10/052 |
| | | | | 180/68.5 |
| 8,365,855 | B2 * | 2/2013 | Mamada | E02F 9/0866 |
| | | | | 180/312 |
| 8,540,042 | B2 * | 9/2013 | Atarashi | B60L 58/26 |
| | | | | 180/68.5 |
| 8,616,619 | B2 * | 12/2013 | Kimura | B60H 1/244 |
| | | | | 454/142 |
| 8,631,890 | B2 * | 1/2014 | Noguchi | E02F 9/207 |
| | | | | 180/311 |
| 8,640,803 | B2 * | 2/2014 | Kinoshita | F01P 11/10 |
| | | | | 180/68.1 |
| 8,919,465 | B2 * | 12/2014 | Takeo | E02F 9/24 |
| | | | | 180/65.21 |
| 9,004,217 | B2 * | 4/2015 | Okumura | E02F 9/20 |
| | | | | 180/291 |
| 9,187,877 | B2 * | 11/2015 | Imano | E02F 9/0866 |
| 9,739,035 | B2 * | 8/2017 | Naito | E02F 3/283 |
| 10,174,482 | B2 * | 1/2019 | Todokoro | E02F 9/0808 |
| 10,323,557 | B2 * | 6/2019 | Kubota | F01P 1/06 |
| 10,556,500 | B2 * | 2/2020 | Mizuno | B60K 13/04 |
| 10,640,949 | B2 * | 5/2020 | Hirasawa | E02F 9/0883 |
| 11,781,291 | B2 * | 10/2023 | Nishigori | B60N 2/75 |
| | | | | 180/315 |
| 12,241,224 | B2 * | 3/2025 | Furukawa | B60K 11/06 |
| 12,345,016 | B2 * | 7/2025 | Okazaki | E02F 9/0875 |
| 12,371,877 | B2 * | 7/2025 | Kitahara | B60L 9/00 |
| 12,416,135 | B2 * | 9/2025 | Takahashi | E02F 9/2292 |
| 2013/0071212 | A1 * | 3/2013 | Yunoue | E02F 9/0883 |
| | | | | 414/685 |
| 2013/0075171 | A1 | 3/2013 | Noguchi et al. | |
| 2022/0259818 | A1 | 8/2022 | Furukawa et al. | |

FOREIGN PATENT DOCUMENTS

| JP | 2007224585 A | 9/2007 |
| JP | 2012001933 A | 1/2012 |
| JP | 2014185572 A | 10/2014 |
| JP | 2020045701 A | 3/2020 |
| WO | 2021192165 A1 | 9/2021 |

* cited by examiner

FRONT ⟵⟶ REAR

FRONT ←——→ REAR

FRONT ⟵⟶ REAR

A-A

C-C

D-D

D-D

WORK MACHINE

CROSS-REFERENCE

This application claims foreign priority of JP2022-028822 filed Feb. 28, 2022, the disclosures of which are hereby incorporated by reference in their entirety.

TECHNICAL FIELD

The present disclosure relates to a work machine driven by battery power.

BACKGROUND ART

Electric work machines with a battery box which houses multiple batteries are known (See Patent Document 1).

In such electric work machines, a fan for a battery located above the battery box cools down the batteries by causing air flow from the bottom to the top of a space where the multiple batteries are housed.

PRIOR ART DOCUMENT

Patent Document

Patent Document 1: Japanese Patent Laid-open Publication No. 2020-045701

SUMMARY OF INVENTION

Technical Problem

Generally, such the electric work machine needs to cool not only the battery, but also an electrical equipment such as electric motors and inverters, as well as a hydraulic oil for actuators. Accordingly it is necessary to arrange additional fans for cooling the electrical equipment and the hydraulic oil in addition to the fan for the battery.

Especially in small work machines such as super-mini excavators in which a space to install the equipment is limited, it is difficult to place the fan for cooling the electrical equipment and hydraulic oil and the fan for the battery, separately, in addition to the electrical and hydraulic equipment.

The present disclosure was made in view of problems of the conventional art mentioned above, and an object is to provide a work machine driven by battery power capable of cooling the equipment generating heat while efficiently arranging the equipment inside the engine room.

Solution to Problem

To solve the above-mentioned problems, the present disclosure provides a work machine including: a battery pack; a first vent provided at a rear end of a machine body; a fan located between the first vent and the battery pack; a second vent located in front of and above the battery pack; and an electric motor rotated by electric power from the battery pack.

According to an embodiment of the present disclosure, the work machine may include a third vent located in front of the battery pack and below the second vent.

According to an embodiment of the present disclosure, the third vent may be located below the battery pack.

According to an embodiment of the present disclosure, the fan may be located above the third vent.

According to an embodiment of the present disclosure, at least part of the fan may be located above the battery pack.

According to an embodiment of the present disclosure, the work machine may include a heat exchanger to cool down hydraulic oil pumped by a hydraulic pump driven by the electric motor, the heat exchanger may be located in the rear of the battery pack and in front of the fan, and the fan may exhaust air inside the machine body to the outside.

According to an embodiment of the present disclosure, the work machine may include a fourth vent located on a side wall of the machine body adjacent to the fan and in front of the fan.

According to an embodiment of the present disclosure, the work machine may include a hydraulic oil tank to store the hydraulic oil and is located below the heat exchanger.

According to an embodiment of the present disclosure, the work machine may include an electrical equipment located above the electric motor that is mechanically coupled to the hydraulic pump located inside a lower side recess of the hydraulic oil tank.

According to an embodiment of the present disclosure, a plurality of battery packs are spaced apart from each other in a front-rear direction.

Advantageous Effects of Invention

According to the present disclosure, it is possible to provide a work machine driven by battery power capable of cooling the equipment generating heat while efficiently arranging the equipment inside the engine room.

DESCRIPTION OF EMBODIMENTS

Figure 1:
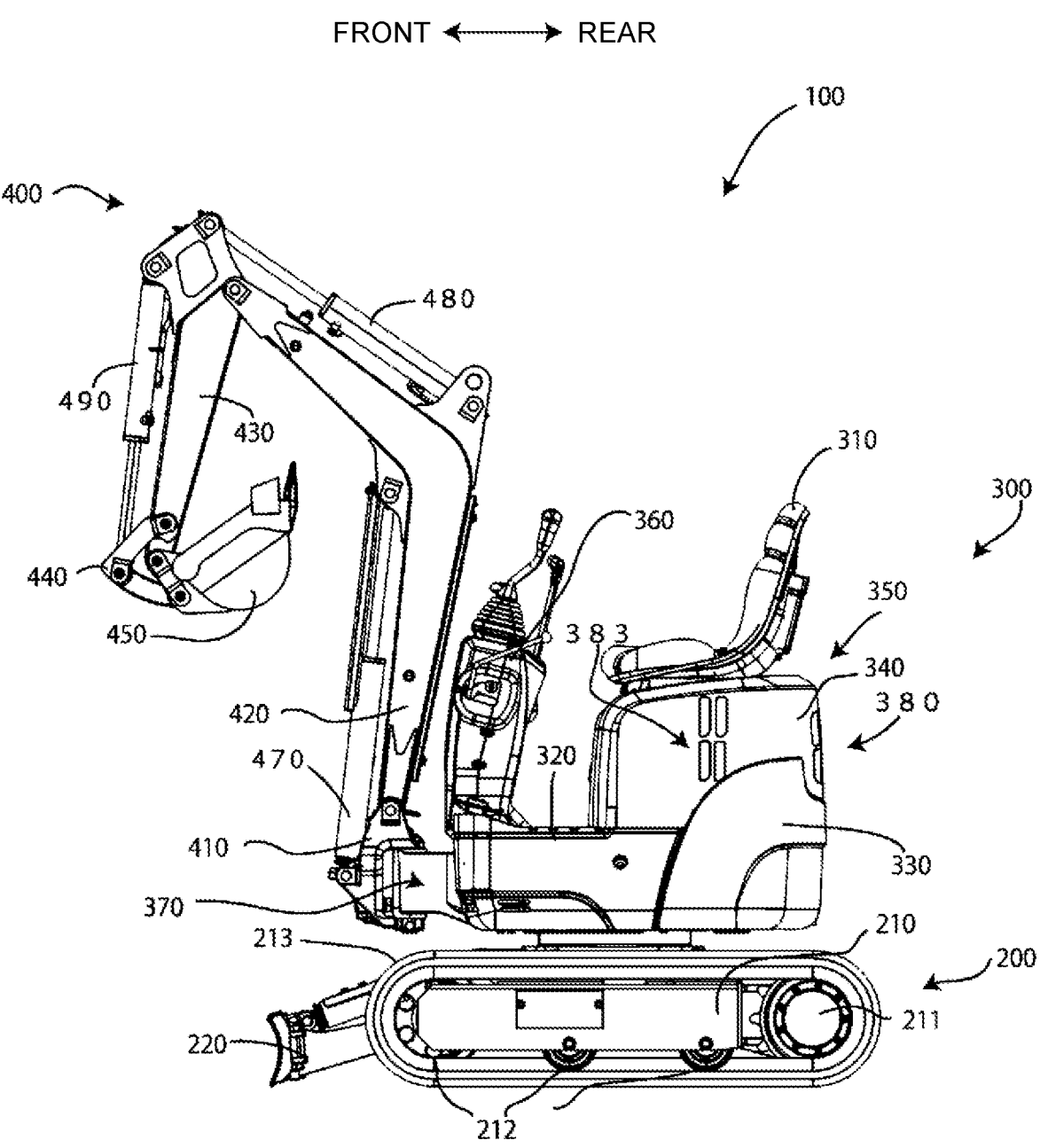
FIG. 1 is a left side view illustrating an electric hydraulic excavator according to an embodiment of the present disclosure.

As a representative example of a work machine of the present disclosure, an electric hydraulic excavator 100 is exemplarily described below with reference to FIG. 1. A forward direction is defined as a direction in which a work equipment 400 is located on an upper revolving body 300, and a rearward direction is defined as a direction opposite to the forward direction.

The electric hydraulic excavator 100 is equipped with a self-propelled lower traveling body 200, an upper revolving body 300 supported horizontally rotatably on the lower traveling body 200, and a work equipment 400 supported vertically rotatably in front of the upper revolving body 300.

The work equipment 400 is composed of a swing post 410 supported horizontally rotatably at the front end of the upper revolving body 300, a boom 420 supported vertically rotatably on the swing post 410, an arm 430 mounted vertically rotatably at the front end of the boom 420, a bucket 450 mounted vertically rotatably at the front end of the arm 430, a swing cylinder 460 mounted below the upper revolving body 300 to rotate the swing post 410 horizontally, a boom cylinder 470 mounted below the boom 420 to move the boom 420, an arm cylinder 480 mounted above the boom 420 to move the arm 430, and a bucket cylinder 490 mounted above the arm 430 to move the bucket 450 via a bucket link 440.

The lower traveling body 200 has a center frame (not shown) and side frames 210 (only one side shown) paired symmetrically on the both sides of the center frame and extending in a front-rear direction. The side frame 210 has a drive wheel 211 (only one side shown) driven by a traveling motor (not shown) at one rear end and a plurality of play wheels 212 (only one side shown) toward the front end. The drive wheel 211 and the play wheels 212 are wound with a crawler 213 (only one side shown), and a soil removing device 220 is mounted in front of the center frame.

The upper revolving body 300 includes: a revolving motor (not shown) for revolving the upper revolving body via a revolving bearing (not shown); an operator's seat 310 arranged at a position from a middle to a rear of the upper revolving body 300; an engine room 350 arranged below the operator's seat 310 and covered from above by a hood 340 which rises from a rear end of a floor 320 and extends to a counterweight 330 forming the rear end of the upper revolving body 300; a lever stand 360 arranged in front of the floor 320, on which various operation devices for operating the electric hydraulic excavator 100 are mounted; and a revolving frame 370 to support the floor 320 from the underside and formed to be integral with the counterweight 330 to support the structure.

Figure 2:
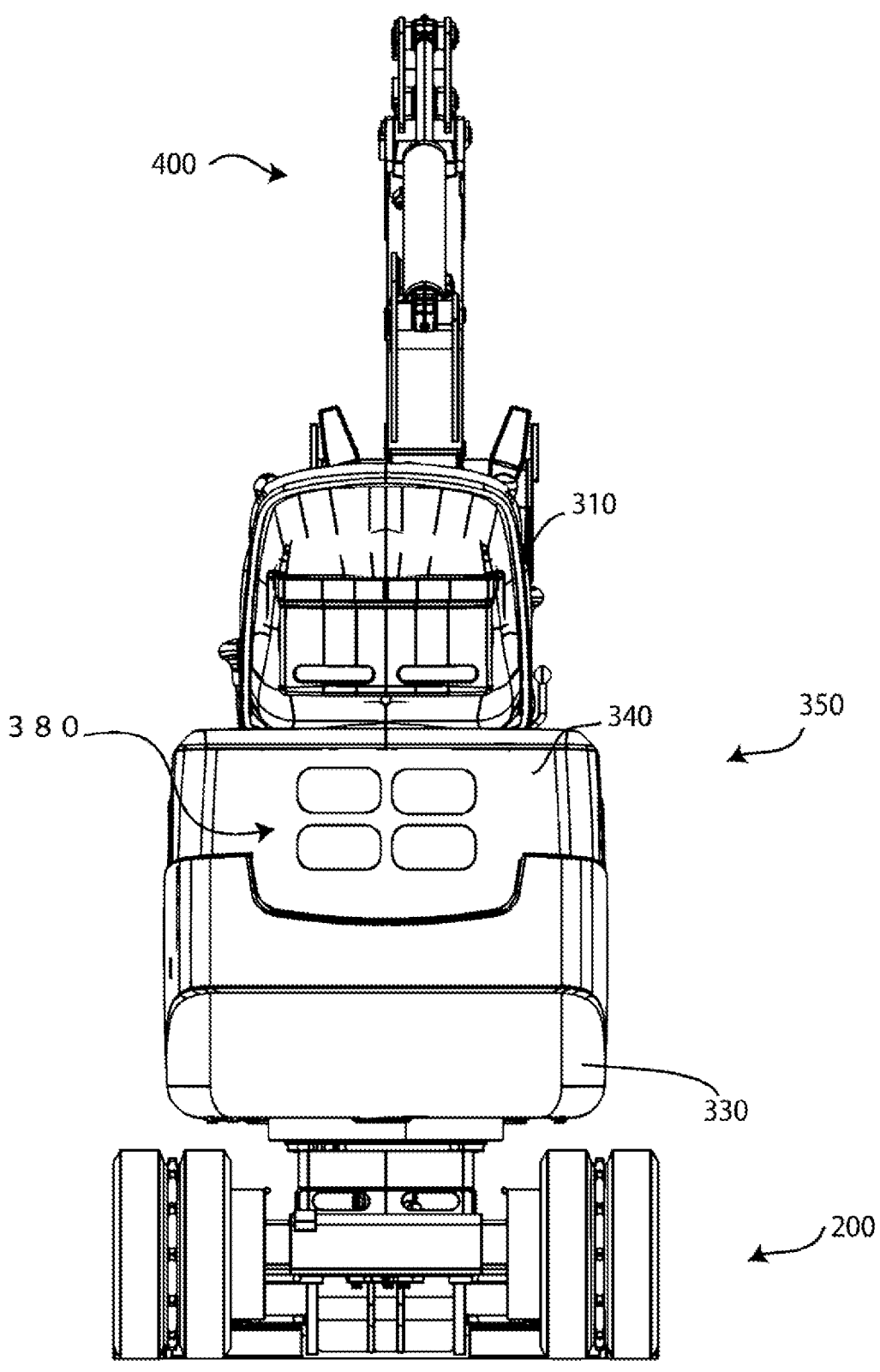
FIG. 2 is a rear view illustrating an electric hydraulic excavator according to an embodiment of the present disclosure.
Figure 3:
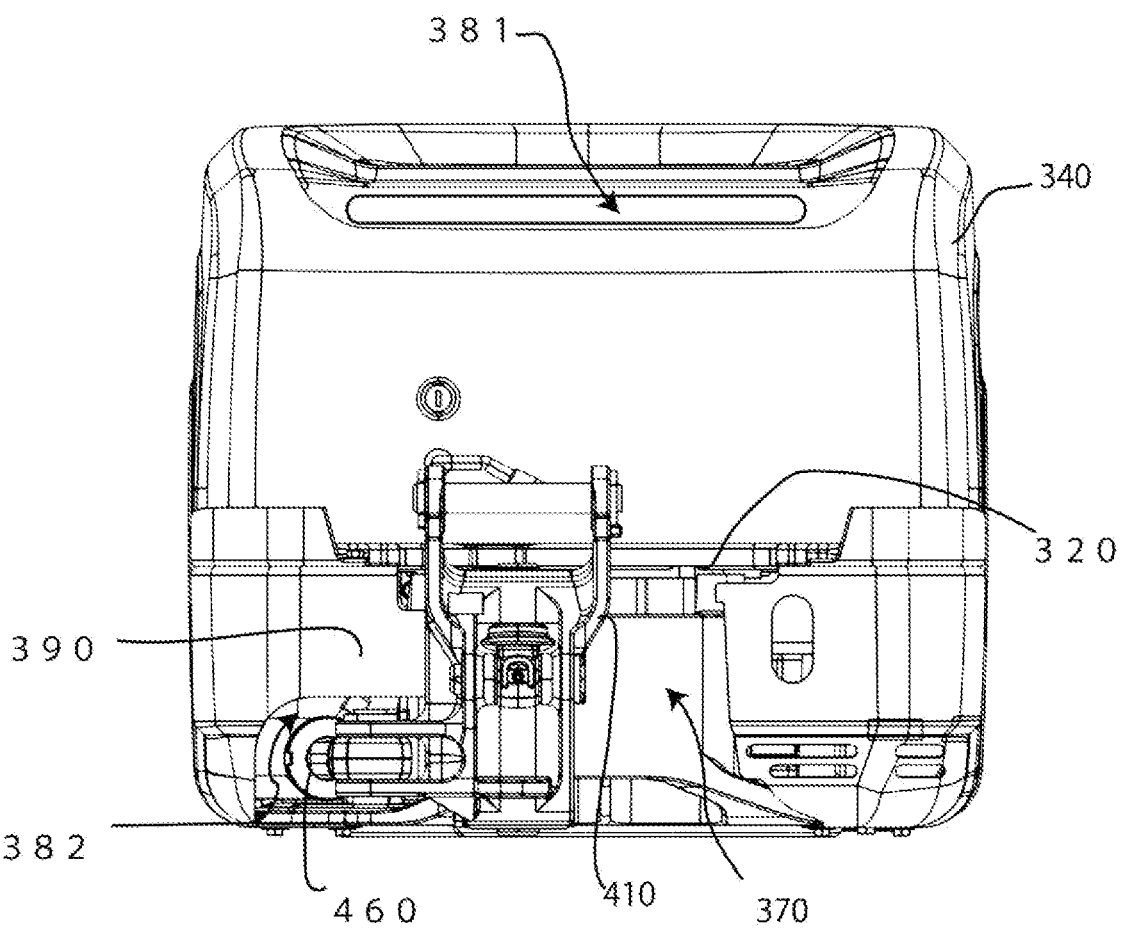
FIG. 3 is a front view illustrating an upper revolving body with a driver's seat and a lever stand removed from the electric hydraulic excavator according to an embodiment of the present disclosure.

Next, an example of a vent to draw air from the outside into the engine room 350 is described with reference to FIGS. 1 through 3.

At the center of the rear side of the hood 340, a first vent 380 consisting of four openings, which are symmetrically perforated at the upper and lower positions, is formed.

At the upper center of the front side of the hood 340, a second vent 381 consisting of an opening, which is perforated so as to extend to about both ends of the operator's seat 310 in the left-right direction, is formed.

Below the right side of the floor 320, the rod side end of the swing cylinder 460 is pivoted to the swing post 410 pivoted horizontally rotatably to the front end of the revolving frame 370. The bottom side end of the swing cylinder 460 is pivoted to the front bottom of the interior side of the counterweight 330. A tube of the swing cylinder 460 is installed so as to overlap the side bottom of the revolving frame 370. A side cover 390, which extends from the front end to the counterweight 330 to cover the lower and side portions of the tube of the swing cylinder 460 and form a duct connecting to the interior of the engine room 350, is installed. Below the front end of the side cover 390, a third vent 382, through which a cylinder rod extends, is formed.

In front of the left side of the hood 340, a fourth vent 383 consisting of four openings, which are symmetrically perforated at the upper and lower positions, is formed.

The first vent 380 is an outlet for discharging air inside the engine room 350 to the outside, while the second vent 381, third vent 382, and fourth vent 383 are an inlet for drawing air from the outside into the engine room 350.

In other words, the first vent 380 and second vent 381 can cause an air flow in the front-back direction upper inside of the engine room 350, thereby making it possible to efficiently draw air from the outside into the engine room 350.

The first vent 380 and the third vent 382 can cause air flow in the front-back direction within a duct composed of the side cover 390 and air flow in the front-back direction below the engine room 350, thereby making it possible to efficiently draw air from the outside into the engine room 350.

Furthermore, the first vent 380 and the fourth vent 383 can cause air flow in the front-back direction in the right side within the engine room 350, thereby making it possible to efficiently draw air from the outside into the engine room.

Figure 4:
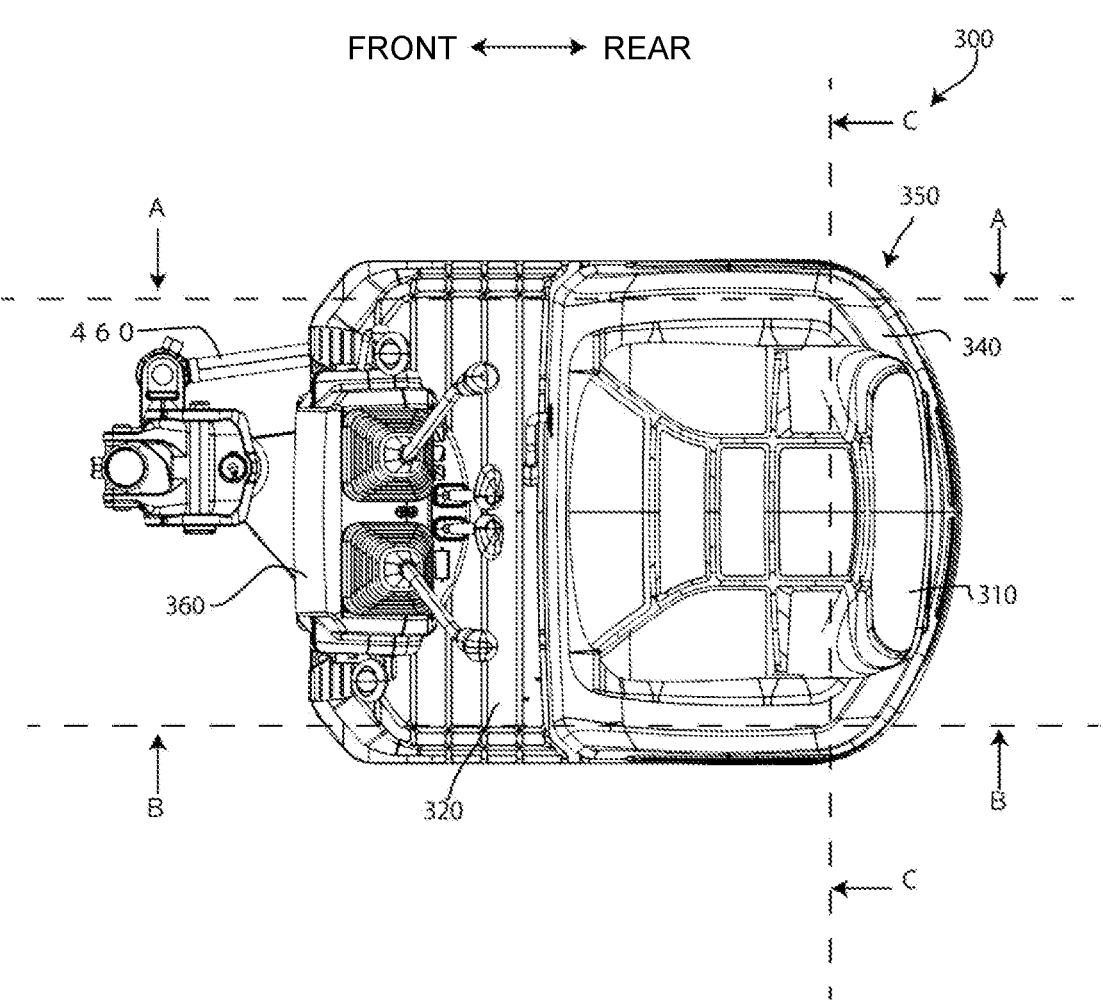
FIG. 4 is a plan view illustrating the upper revolving body of the electric hydraulic excavator according to an embodiment of the present disclosure.
Figure 5:
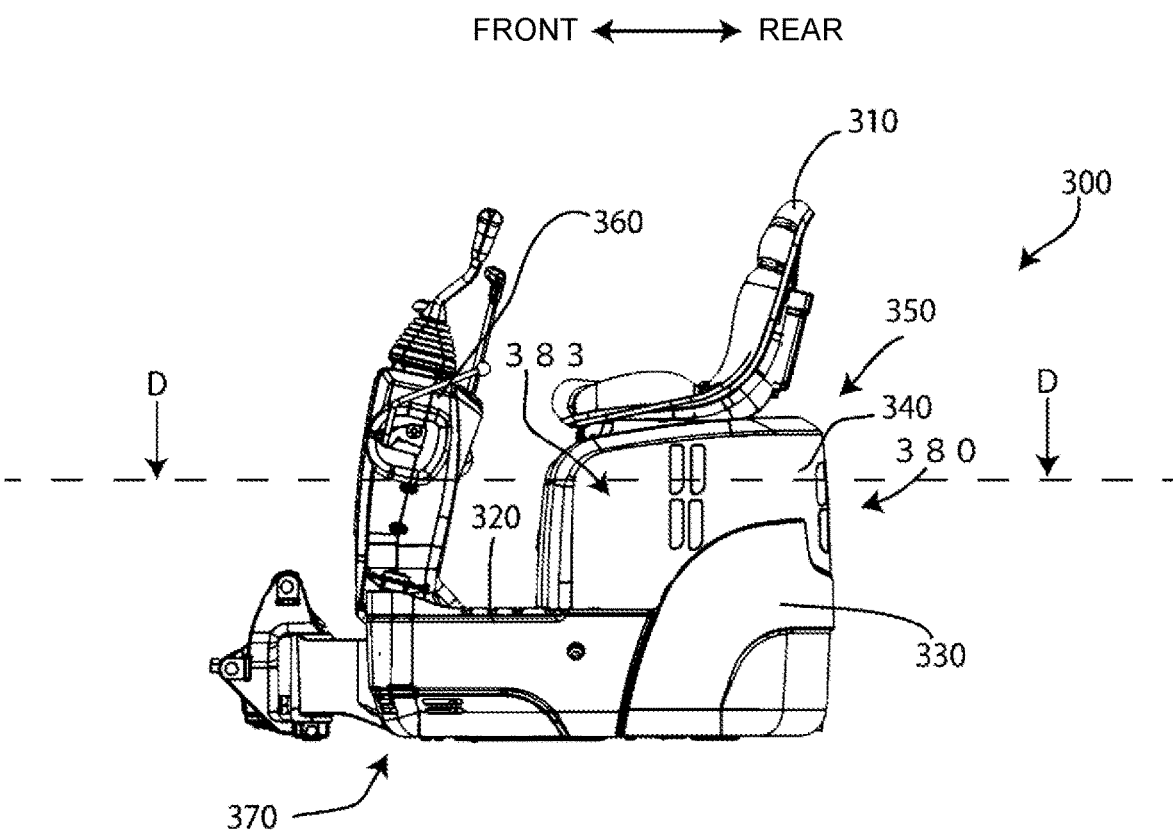
FIG. 5 is a left side view illustrating the upper revolving body of the electric hydraulic excavator according to an embodiment of the present disclosure.
Figure 6:
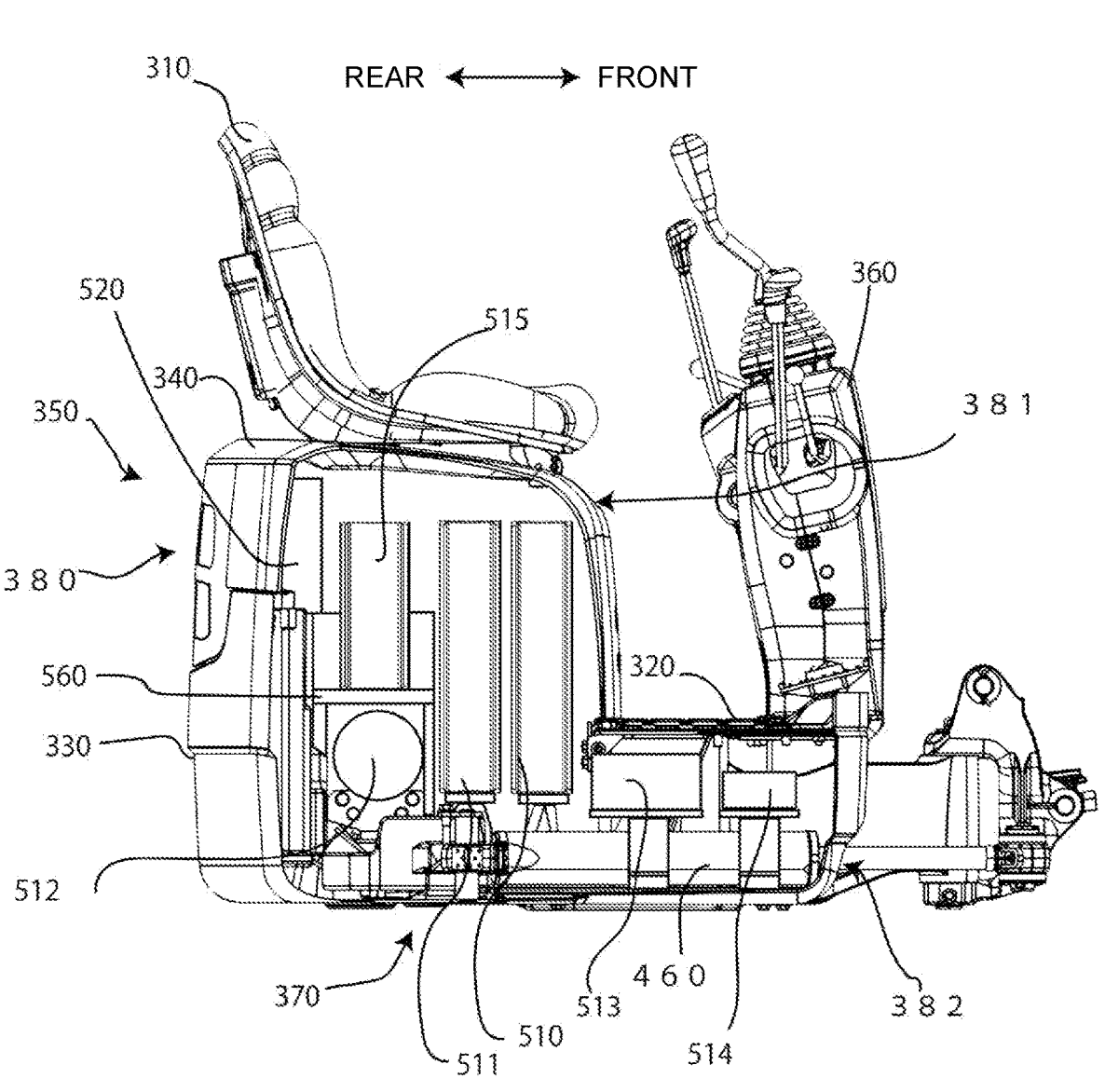
FIG. 6 is a cross-sectional view taken by line A-A of the upper revolving body of the electric hydraulic excavator according to an embodiment of the present disclosure.
Figure 7:
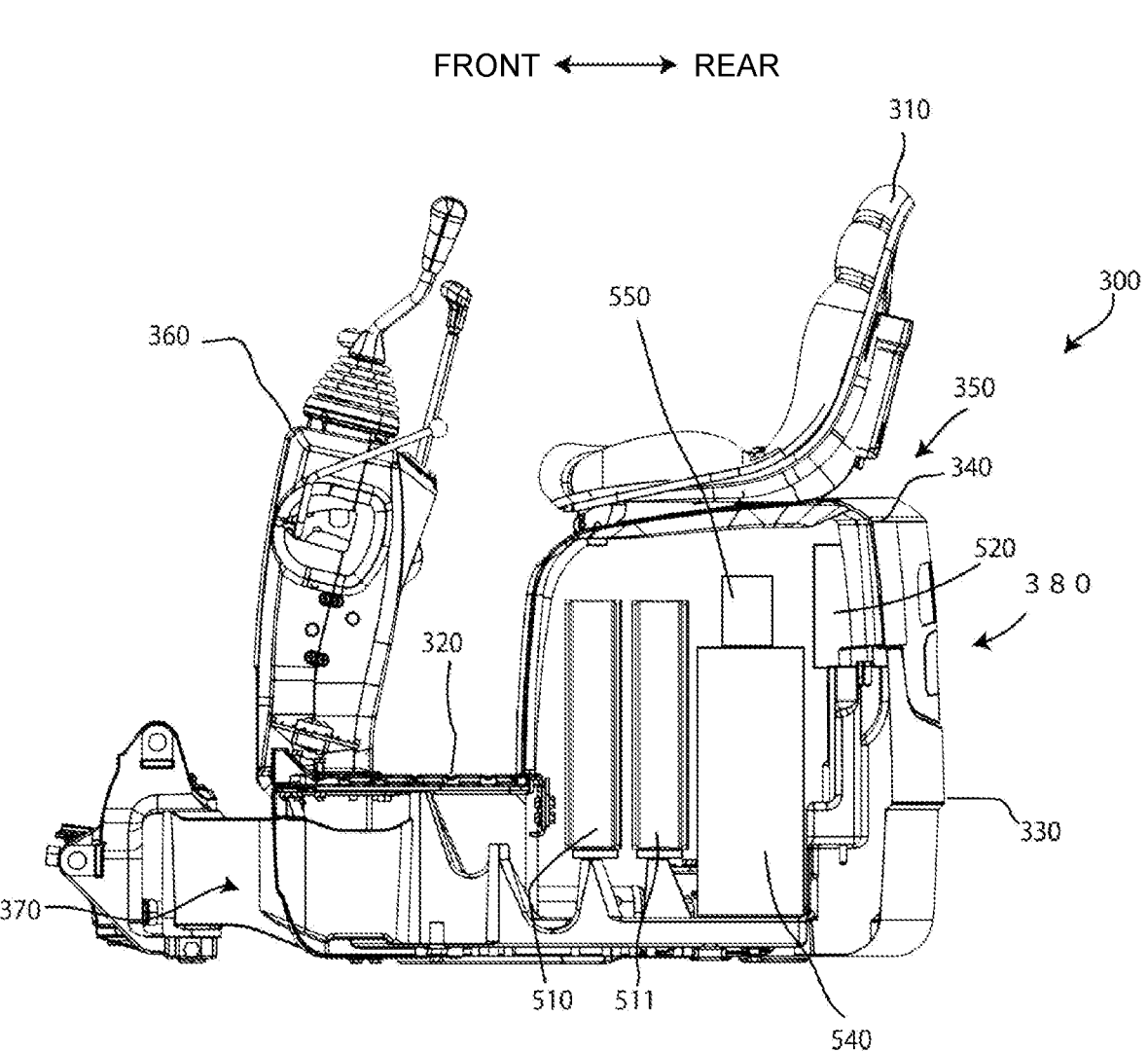
FIG. 7 is a cross-sectional view taken by line B-B of the upper revolving body of the electric hydraulic excavator according to an embodiment of the present disclosure.
Figure 8:
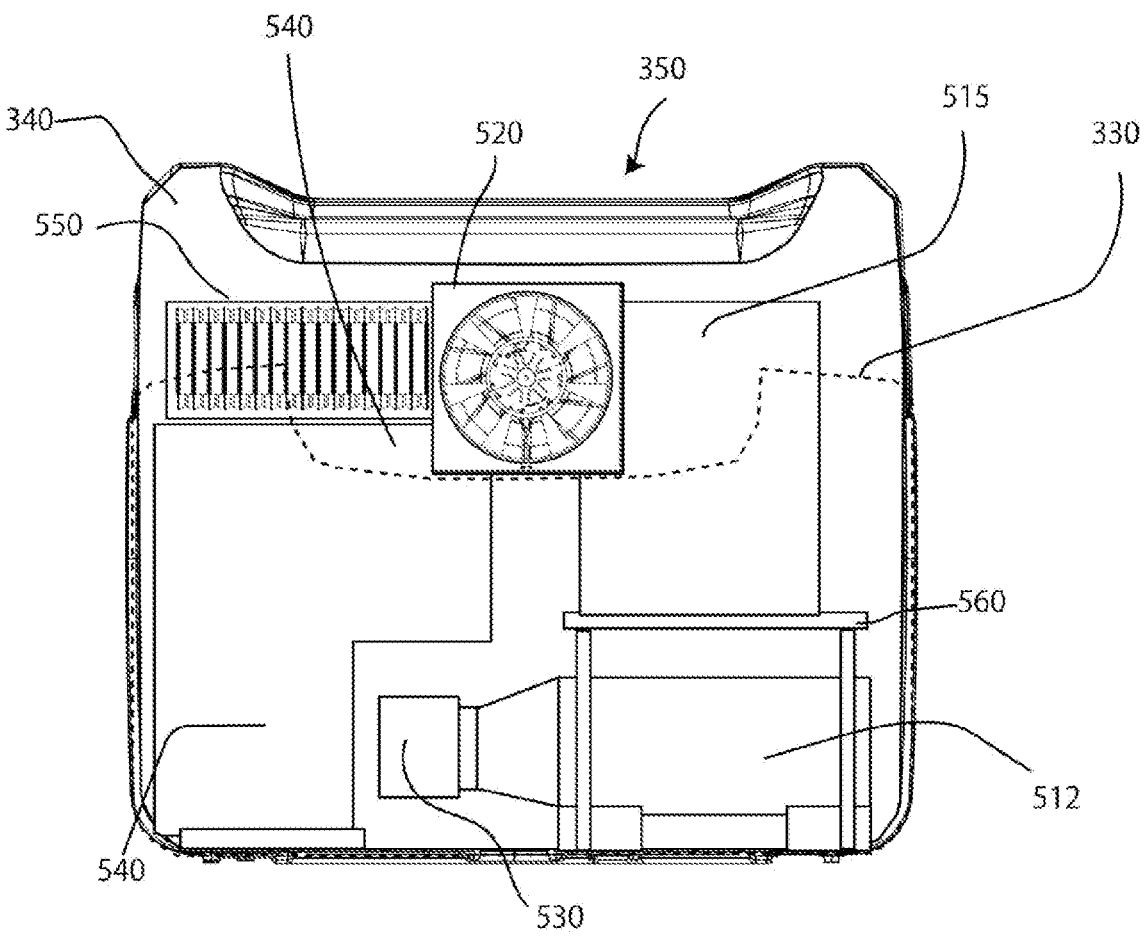
FIG. 8 is a cross-sectional view taken by line C-C of the upper revolving body of the electric hydraulic excavator according to an embodiment of the present disclosure.
Figure 9:
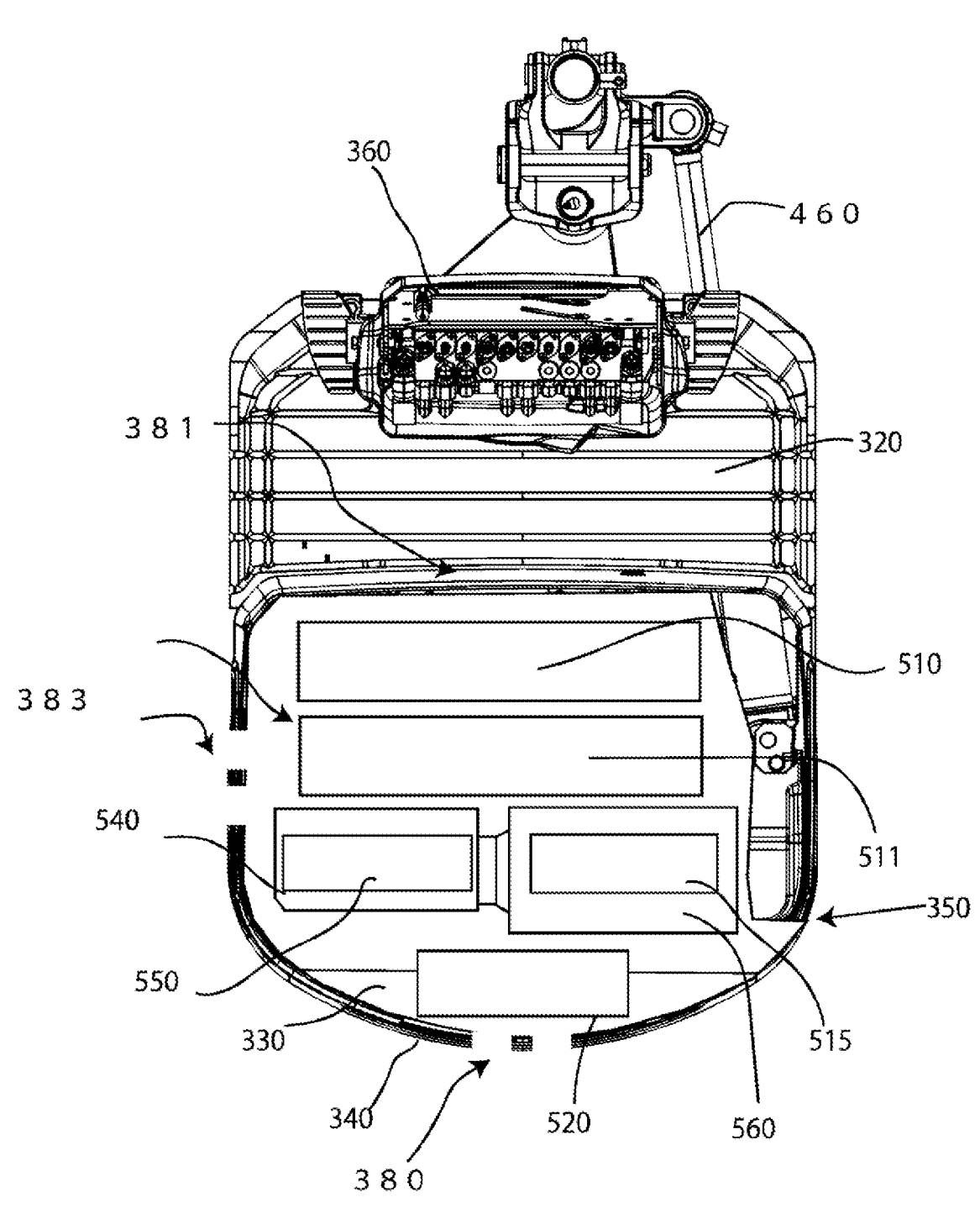
FIG. 9 is a cross-sectional view taken by line D-D of the upper revolving body of the electric hydraulic excavator according to an embodiment of the present disclosure.

Next, with reference to FIGS. 4 and 5, the interior of the engine room 350 and the duct formed by the side cover 390, which is connected to the engine room 350, are described below.

Inside the engine room 350, there are arranged a first battery pack 510 vibration-proofly supported on the bottom of the revolving frame 370 so as to face the front inner wall of the hood 340 and a second battery pack 511 vibration-proofly supported on the bottom of the revolving frame 370 in the rear of the first battery pack 510 and forward from the middle position of the engine room 350.

Here, since the first battery pack 510 and second battery pack 511 are positioned forward from the middle position of the engine room 350, it allows the possibility of damage to the battery packs to be reduced even if an obstacle strikes the rear or front end of the upper revolving body 300.

Furthermore, since the first battery pack 510 and second battery pack 511 are extended to the vicinity of the right and left side walls of the engine room 350 and the upper ends of the first battery pack 510 and second battery pack 511 are located below the second vent 281, it allows an upper flow path to be formed for air to flow between the ceiling of the engine room 350 and the upper ends of the first battery pack 510 and second battery pack 511.

Moreover, since a space is provided between the sides of the first battery pack 510 and second battery pack 511, it allows an upward flow path to be formed where air flows from the lower to the upper portions of the batteries due to the heat generated by the first battery pack 510 and second battery pack 511, and thus the upper flow path and upward flow path can be connected.

Viewed from the rear, the counterweight 330 has a recess which fits with a convex portion of the rear end of the hood 340, and the electric fan 520, which is vibration-proofly supported in the middle of the recess of the counterweight 330, is positioned so as to face the inner wall of the rear end of the hood 340.

The electric fan 520 faces the first vent 380 and causes the fan to rotate in order to discharge air from the first vent 380 to the outside of the engine room 350, thereby discharging air taken in from the second vent 381, third vent 382, and fourth vent 383 to the outside from the first vent 380.

Between the counterweight 330 and the second battery pack 511, there are arranged an electric motor 512 which is vibration-proofly supported on the bottom of the revolving frame 370 with one end facing the side wall of the engine room 350 and is rotated by the electric power from the first battery pack 510 and second battery pack 511, a hydraulic pump 530 which is driven by the electric motor 512 and pumps hydraulic oil to move each actuator and is attached to the other end of the electric motor 512, and a hydraulic oil tank 540 which is located next to the hydraulic pump 530 and faces the side wall of the engine room 350 to store hydraulic oil.

The hydraulic oil tank 540 has a recess formed by undercutting a part of the lower portion of the side adjacent to the hydraulic pump 530. The hydraulic pump 530 is placed inside the recess, thereby efficiently housing the electric motor 512, hydraulic pump 530, and hydraulic oil tank 540 within the engine room 350.

Between the electric fan 520 and the second battery pack 511, there are arranged an oil cooler 550 which cools down the hydraulic oil flowing above the hydraulic oil tank 540 and a junction box 515, which is vibration-proofly supported on a pedestal 560 mounted on the bottom of the upper revolving body 300 so as to cross the electric motor 512 from above, to connect the power from the first battery pack 510 and second battery pack 511 to the inverter 513, converter 514 and charging device (not shown).

That is, in the rear of the second battery pack 511, hydraulic equipment such as the hydraulic pump 530, hydraulic oil tank 540, and oil cooler 550 is located on one side of the engine room 350, and electrical equipment such as the electric motor 512 and junction box 515 is located on the other side of the engine room 350.

In addition, a fourth vent 383 is located above the side of the engine room 350, which faces the hydraulic oil tank 540, and in front of the oil cooler 550. As a result, it allows hydraulic equipment with high heat temperature located on one side of the machine body in the rear of the second battery pack 511 to be efficiently cooled down. It is possible to place the hydraulic and electrical equipment in the engine room 350 without deteriorating cooling and storage efficiency.

Between the floor 320 and the tube of the swing cylinder 460, an inverter 513, which is vibration-proofly supported by a pedestal 570 mounted on the bottom of the upper revolving body 300 so as to cross the tube of the swing cylinder 460 from above, is located in front of the first battery pack 510, and controls the power supplied from the first battery pack 510 and second battery pack 511 to the electric motor 512.

Furthermore between the floor 320 and the tube of the swing cylinder 460, a converter 512, which is vibration-proofly supported by a pedestal 580 mounted on the bottom of the upper revolving body 300 so as to cross the tube of the swing cylinder 460 from above, is located in front of the inverter 513, and converts the voltage of the power from the first battery pack 510 and second battery pack 511 in order to supply power to the controller (not shown) for integrally controlling the electric hydraulic excavator 100 and to a low-voltage battery (not shown) for supplying power to the electric fan 520.

A duct formed by the floor 320 and side cover 390 forms a flow path for air flowing along the swing cylinder 460 and is connected to the engine room 350 to form a lower flow path for air flowing the bottom of the upper revolving body 300. It is then connected to the upward flow path formed between the first battery pack 510 and the second battery pack 511.

Figure 10:
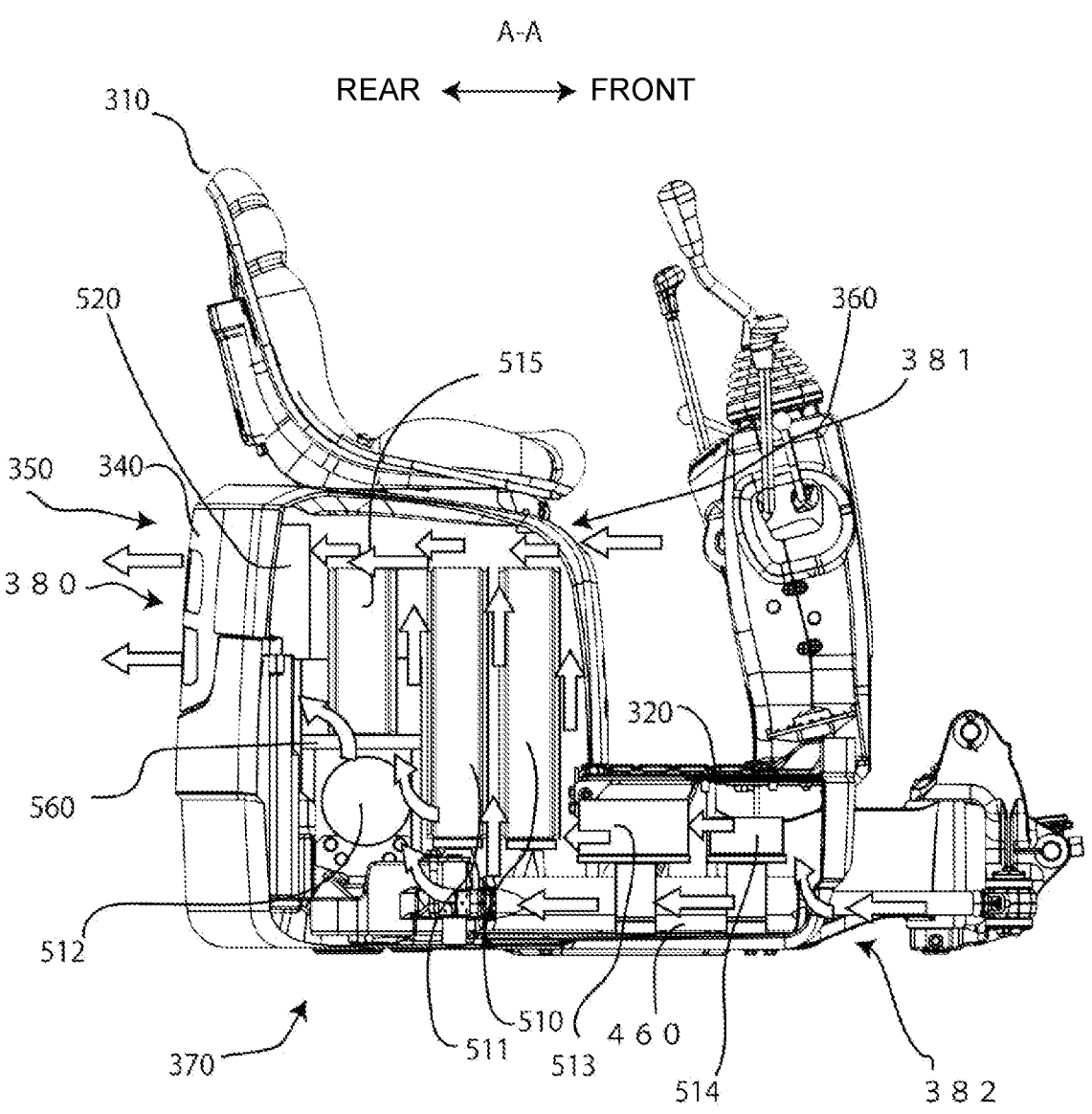
FIG. 10 is a schematic diagram illustrating air flow on the A-A cross section of the upper revolving body of the electric hydraulic excavator according to an embodiment of the present disclosure.
Figure 11:
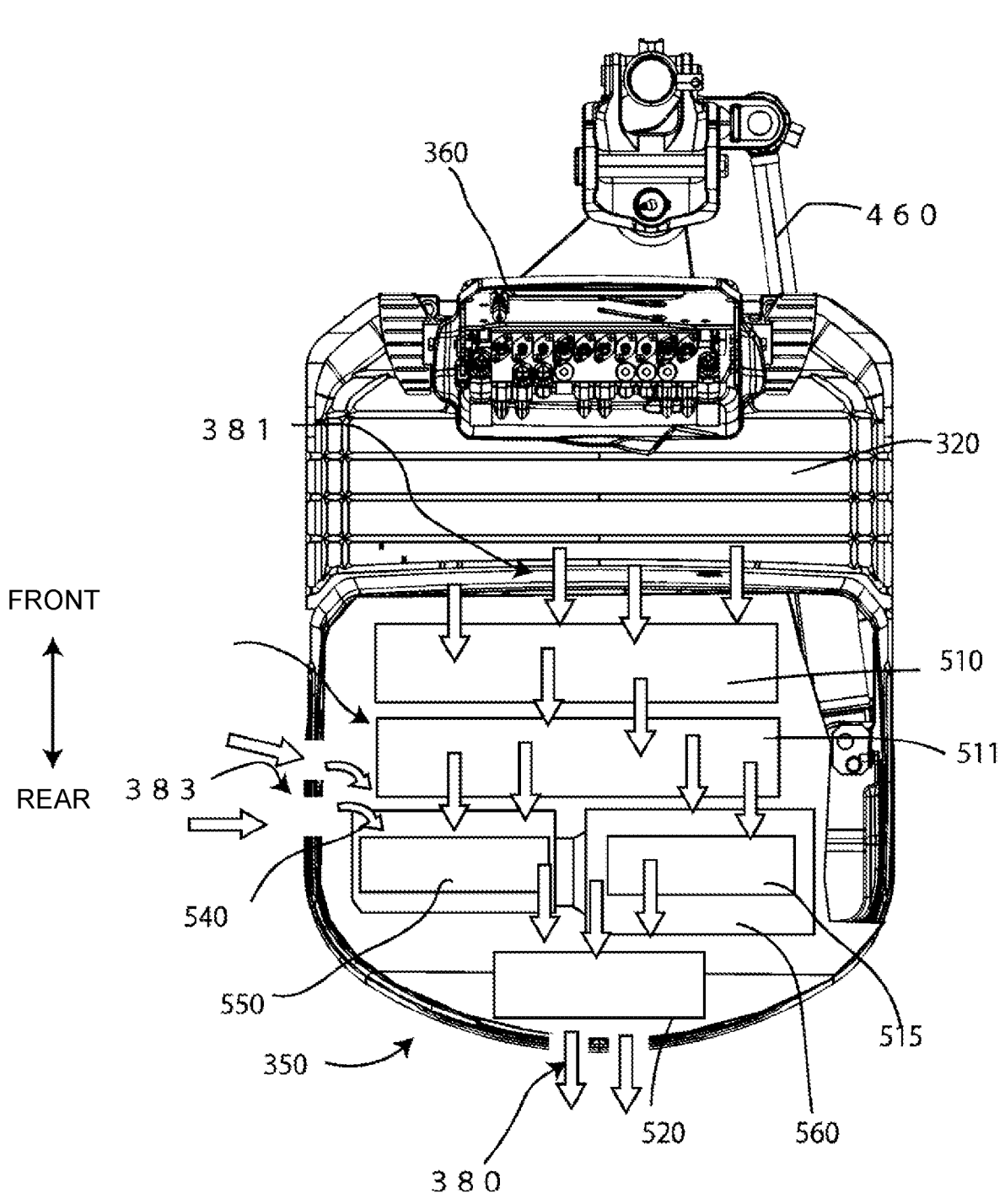
FIG. 11 is a schematic diagram illustrating air flow on the D-D cross section of the upper revolving body of the electric hydraulic excavator according to an embodiment of the present disclosure.

Next, the air flow into and out of the engine room 350 is described with reference to FIGS. 10 and 11. Here, arrows in the drawings schematically indicate air flow direction.

The upper flow path, which passes from the second vent 381 through above the first battery pack 510 and second battery pack 511 and through above the junction box 515 and oil cooler 550 to the cooling fan 520 installed so that a part thereof protrudes above the upper end of the first battery pack 510, second battery pack 511, junction box 515 and oil cooler 550, leads to the first vent 380 to form an air flow from the front to the rear of the machine body above the inside of the engine room 350 by the cooling fan 520.

The air flow from the front to the rear of the machine body above the engine room 350 is heated by the electric and hydraulic equipment installed in the engine room 350, thereby efficiently discharging the air rising toward the top of the engine room 350 from the first vent 381 to the outside.

Furthermore, by providing a space between the sides of the first battery pack 510 and the second battery pack 511, it is possible to merge the air flow from the lower to the upper portion due to the heat generated by the first battery pack 510 and second battery pack 511 with the air flow from the front to the rear of the machine body above the engine room 350.

The duct formed by the floor 320 and side cover 390, which has the third vent as the inlet port, forms an air flow flowing from the front to the rear along the swing cylinder 460 by the cooling fan 520. The air having cooled down the converter 514 and inverter 513 which are placed above the swing cylinder flows into the middle of the engine room 350 and forms an air flow flowing in the front-rear direction along the bottom of the upper revolving body 300, while generating an updraft caused by heat of the electric motors and hydraulic equipment installed in the engine room 350. The air rises while cooling down the electric motor 512, hydraulic pump 530, and hydraulic oil tank 550, and then is heated and discharged from the first vent 380.

The updraft caused by heat of the electrical and hydraulic equipment merges with the air flow flowing from the front to the rear of the machine body above the engine room 350, thereby discharging the heated air from the first vent 380 without retaining in the engine room 350.

In addition, the third vent 382 is located at a position lower than the first vent 380, and the third vent 381 is located at a position lower than the cooling fan, so that a flow rate of the air flowing from the front to the rear of the machine body above the engine room 350 is greater than that of the air flowing in the front-back direction along the bottom of the upper revolving body 300. As a result, it is possible to merge more air flowing from the lower to the upper portion with the air flowing from the front to the rear of the machine body above the engine room 350 and efficiently discharge the heated air inside the engine room 350 from the first vent 380 to the outside.

Furthermore, the air flow flowing in the front-back direction along the bottom of the upper revolving body 300 can form an air flow flowing below the first battery pack 510 and second battery pack 511 and flowing from the lower to the upper portion between the sides of the first battery pack 510 and the second battery pack 511, thereby efficiently cooling down the first battery pack 510 and second battery pack 511.

The upper flow path from the second vent 381 to the first vent 380 has the fourth vent 383 on the side wall of the engine room 350 on the hydraulic oil tank 540 and oil cooler 550 side. By generating an air flow from the fourth vent 383 toward the hydraulic oil tank 540 and oil cooler 550, it is possible to efficiently cool down the hydraulic equipment heated more than the electric equipment.

In the above, according to another embodiment, other vents can be installed near the floor 320 in front of the engine room 350, in which case the first battery pack 510 can be cooled more efficiently from the front.

As a further alternative example, air may be taken into the engine room 350 through the first vent 380 and exhausted from the second, third, and fourth vents.

The various configurations in the other embodiment or alternative example can be employed in combination with the various configurations of the embodiments mentioned above as appropriate.

The description has been made to the hydraulic excavator as the example of the work machine, but the work machine is not limited to the hydraulic excavator and may be any other construction machine such as a wheel loader, or a compact truck loader.

The embodiment of the present disclosure has been described above, but the scope of the present disclosure is not limited thereto, and can be carried out within an extended or modified range without departing from the gist of the present disclosure.

INDUSTRIAL APPLICABILITY

The present disclosure provides a work machine and has industrial applicability.

REFERENCE SIGNS LIST

380 First vent
381 Second vent
382 Third vent
510 First battery pack
512 Electric motor
520 Electric fan (fan)

The invention claimed is:

1. A work machine comprising:
a battery pack;
a first vent located at a rear end of a machine body;
a fan located between the first vent and the battery pack;
a second vent located in front of and above the battery pack;
a third vent located at a bottom front end of the machine body and below the battery pack, and
an electric motor rotated by electric power from the battery pack, wherein the first vent and the second vent are located in a front-rear direction of the work machine with the battery pack in between, and
wherein air flows from the third vent laterally and then upward through an upward flow passage formed on a lateral side of the battery pack such that air flows in an upward direction of the work machine.

2. The work machine according to claim 1, further comprising the third vent located in front of the battery pack and below the second vent.

3. The work machine according to claim 2, wherein the fan is located above the third vent.

4. The work machine according to claim 1 wherein at least part of the fan is located above the battery pack.

5. The work machine according to claim 1, further comprising a heat exchanger to cool down hydraulic oil pumped by a hydraulic pump driven by the electric motor,
wherein the heat exchanger is between the battery pack and the fan, and
the fan exhausts air inside the machine body to the outside.

6. The work machine according to claim 5 further comprising a fourth vent located on a side wall of the machine body adjacent to the fan and in front of the fan.

7. The work machine according to claim 5 further comprising a hydraulic oil tank located below the heat exchanger to store the hydraulic oil.

8. The work machine according to claim 7 further comprising an electrical equipment located above the electric motor that is coupled to the hydraulic pump,
wherein the hydraulic oil tank has a recess that in a lower portion of a side adjacent to the hydraulic pump, and the hydraulic pump is located inside the recess of the hydraulic oil tank.

9. The work machine according to claim 1, wherein a plurality of battery packs are spaced apart from each other in a front-rear direction.

10. A work machine comprising:
a battery pack;
a first vent located at a back of a hood that defines a part of an engine room accommodating the battery pack;
a fan located between the first vent and the battery pack; and
a third vent connected to the engine room located in front of the hood and lower than the first vent, wherein the first vent and the third vent are located in a front-rear direction of the work machine with the battery pack in between, and
wherein air flows from the third vent laterally and then upward through an upward flow passage formed on a lateral side of the battery pack such that air flows in an upward direction of the work machine.

11. The work machine according to claim 10, wherein an air flow that flows from the third vent to the engine room is caused to flow below a floor extending forward from a front lower edge of the hood.

* * * * *